United States Patent [19]
Chan

[11] Patent Number: 5,560,344
[45] Date of Patent: Oct. 1, 1996

[54] FUEL STORAGE AND DELIVEY APPARATUS OF A MULTI-FUEL ENGINE AND PROCESS

[75] Inventor: Anthony K. Chan, Peoria, Ill.

[73] Assignee: Caterpillar Inc., Peoria, Ill.

[21] Appl. No.: 294,678

[22] Filed: Aug. 23, 1994

[51] Int. Cl.⁶ .......................... F02B 13/00; F02B 25/00; F02B 43/00
[52] U.S. Cl. .................. 123/515; 123/575; 123/25 A; 123/25 C
[58] Field of Search ..................... 123/575, 25 R, 123/25 A, 25 C, 515

[56] References Cited

U.S. PATENT DOCUMENTS

| | | | |
|---|---|---|---|
| 4,031,864 | 6/1977 | Crothers | 123/575 |
| 5,237,978 | 8/1993 | Bailey | 123/515 |

FOREIGN PATENT DOCUMENTS

| | | | |
|---|---|---|---|
| 4133887 | 4/1992 | Germany | 123/575 |
| 0159558 | 12/1981 | Japan | 123/575 |
| 0110757 | 7/1982 | Japan | 123/575 |
| 0096155 | 6/1993 | Japan | 123/575 |

*Primary Examiner*—Erick R. Solis
*Attorney, Agent, or Firm*—Pankaj M. Khosla

[57] ABSTRACT

A fuel storage and delivery apparatus for providing one or more non-miscible fuels to a multi-fuel engine has a fuel reservoir adapted for storing first and second non-miscible fuels in communication with each other. The first and second fuels define a phase interface therebetween. The fuel reservoir has a bottom, and first and second outlets adapted to respectfully receive first and second fuels. The first and second outlets are positioned adjacent the bottom and the phase interface. The fuel delivery apparatus has means for respectfully maintaining the first and second outlets adjacent the bottom and the phase interface. The fuel delivery apparatus also has means for sensing the fluid levels of the first and second non-miscible fuels in the reservoir, and producing fluid level signals in response to the sensed fluid levels. The fuel delivery apparatus further has flow rate sensing means for measuring fluid flow rate of the first and second non-miscible fuels passing through conduits and producing a flow rate signal representative of the sensed fluid flow rate. The fuel delivery apparatus still further has a flow controller electrically connected to the level sensing means and the flow rate sensing means. The flow controller is adapted to receive the fluid level signal and the flow rate signal, and maintain the flow rate of the first and second fuels at predetermined values, the values being a function of the fluid level signal and the flow rate signal.

21 Claims, 2 Drawing Sheets

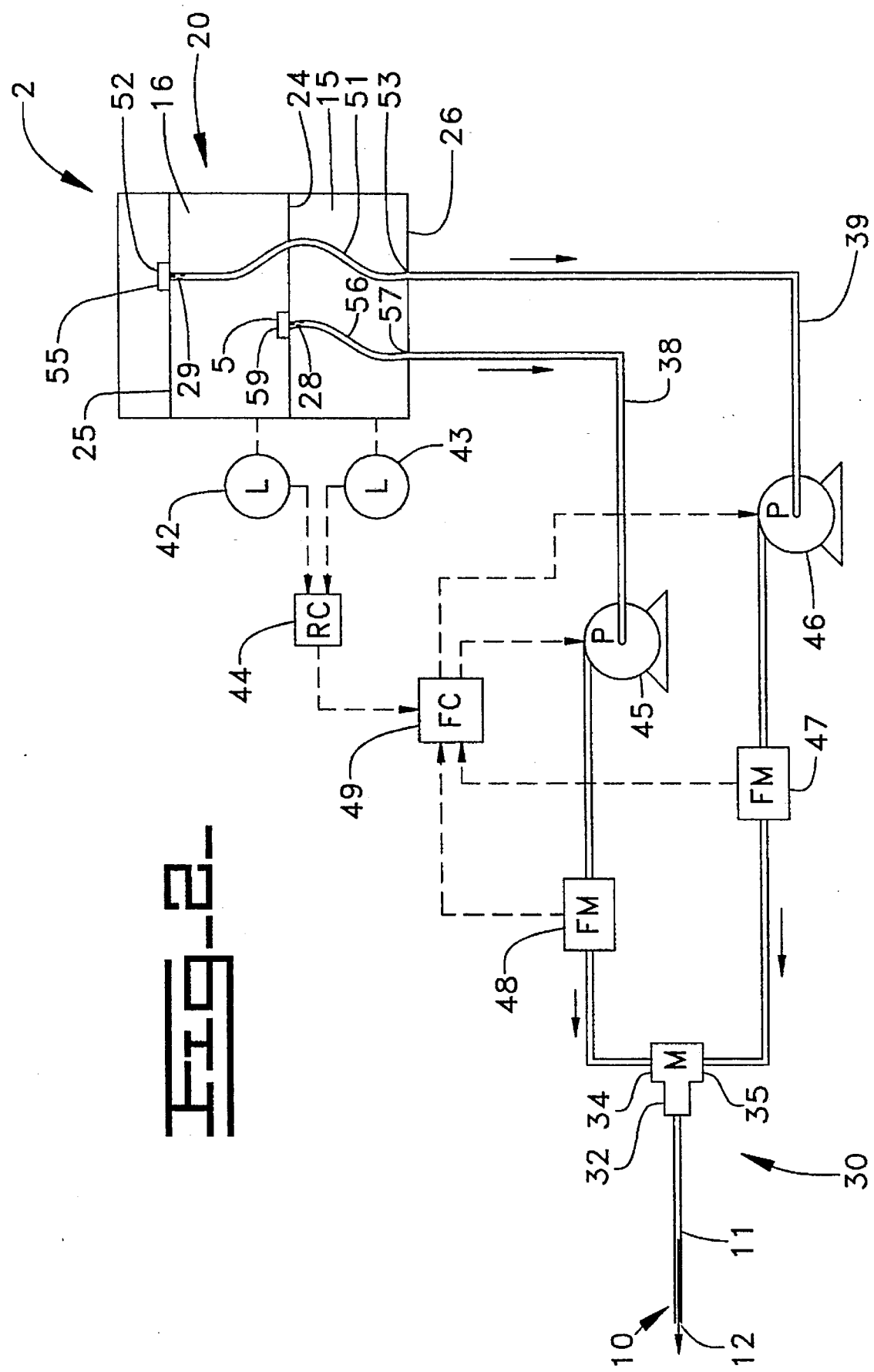
Fig_2

FUEL STORAGE AND DELIVEY APPARATUS OF A MULTI-FUEL ENGINE AND PROCESS

TECHNICAL FIELD

The present invention relates to a fuel handling system in a multi-fuel engine, and more particularly to an apparatus for storage and delivery of a plurality of non-miscible fuels from a single fuel tank in a multi-fuel engine and a process.

BACKGROUND ART

One of the advantages of a flexible-fuel or a multi-fuel engine is the ability to run on different fuels having different calorific values. Sometimes, two miscible fuels, mixed in a certain volume ratio, may be stored in one fuel tank. At other times, if the two fuels are non-miscible, two fuel tanks may be used. In the operation of a multi-fuel diesel cycle engine, the characteristics of the fuel entering the combustion chambers may change rapidly due to incomplete mixing of the two fuels, such as methanol and diesel fuel. This may occur due to phase separation of the two partially miscible fuels in a single fuel tank, especially if the vehicle has been stationary for a long time. At other times, the characteristics of the fuel entering the combustion chambers may change drastically, during the transition from one type of fuel to another. When this happens, the engine performance suffers, usually evidenced by a transient loss in power. To overcome these inherent problems, one well known solution is to identify the fuel being used by a sensor, and appropriately change the flow rate of the fuel entering the combustion chambers and the injection timing, or the ignition timing of the engine. However, this requires the use of very fast acting sensors and pumps to respectfully sense and respond to the changing fuel characteristics and may not work as well.

It is desirable to have a fuel storage and feeding system having only one fuel tank capable of handling multiple non-miscible fuels for a multi-fuel engine. It is also desirable that these multiple fuels be simultaneously withdrawn and delivered to the engine in a constant volumetric ratio. It is further desirable to provide a smooth transition from one depleted fuel to another available fuel, without causing any sudden change in the engine performance, even though each fuel may have a different calorific value. Further, the fuel storage and delivery system should be economical. The present invention is directed to overcome one or more of the problems as set forth above.

DISCLOSURE OF THE INVENTION

In one aspect of the invention, a fuel storage and delivery apparatus for providing one or more non-miscible fuels to a multi-fuel engine has a fuel reservoir adapted for storing first and second non-miscible fuels in communication with each other. The first and second fuels define a phase interface therebetween and the second fuel has an upper fluid surface. The fuel reservoir has a bottom, a first outlet adapted to receive the first fuel, and a second outlet adapted to receive the second fuel. The first and second outlets are respectfully positioned adjacent one of, the bottom and the phase interface, and the phase interface and the upper fluid surface. A mixing chamber is connectable in fluid communication with the first and second outlets, and to the engine. The mixing chamber is adapted to receive the first and second fuels and supply a mixture of the fuels in a predetermined ratio to the engine.

In another aspect of the invention, a fuel storage and delivery apparatus for providing one or more non-miscible fuels to a multi-fuel engine has a fuel reservoir adapted for storing first and second non-miscible fuels in communication with each other. The first and second fuels define a phase interface therebetween and the second fuel has an upper fluid surface. The fuel reservoir has a bottom, a first outlet adapted to receive the first fuel, and a second outlet adapted to receive the second fuel. The first and second outlets are respectfully positioned adjacent one of, the bottom and the phase interface, and the phase interface and the upper fluid surface. The fuel delivery apparatus has means for respectfully maintaining the first and second outlets adjacent one of, the bottom and the phase interface, and the phase interface and the upper fluid surface. The fuel delivery apparatus also has means for sensing the fluid levels of the first and second non-miscible fuels in the reservoir, and producing fluid level signals in response to the sensed fluid levels. The fuel delivery apparatus further has flow rate sensing means for measuring fluid flow rate of the first and second non-miscible fuels passing through conduits and producing a flow rate signal representative of the sensed fluid flow rate. The fuel delivery apparatus still further has a flow controller electrically connected to the level sensing means and the flow rate sensing means. The flow controller is adapted to receive the fluid level signal and the flow rate signal, and maintain the flow rate of the first and second fuels passing through conduits at predetermined values, the values being a function of the fluid level signal and the flow rate signal.

In yet another aspect of the invention, a process for storing and delivering one or more non-miscible fuels to a multi-fuel engine, comprises the steps of, storing a first and second non-miscible fuel in a single fuel reservoir, sensing the fluid levels of the first and second fuels in the reservoir, determining a flow ratio of the respective flow rates of the first and second fuels as a function of the fluid levels, and pumping the first and second fuels from the reservoir at respective flow rates, the flow rates being in the predetermined flow ratio.

BRIEF DESCRIPTION OF THE DRAWINGS

FIG. 2 is a diagrammatic view of a storage and delivery apparatus of another embodiment of the invention.

BEST MODE FOR CARRYING OUT THE INVENTION

Figure 1:
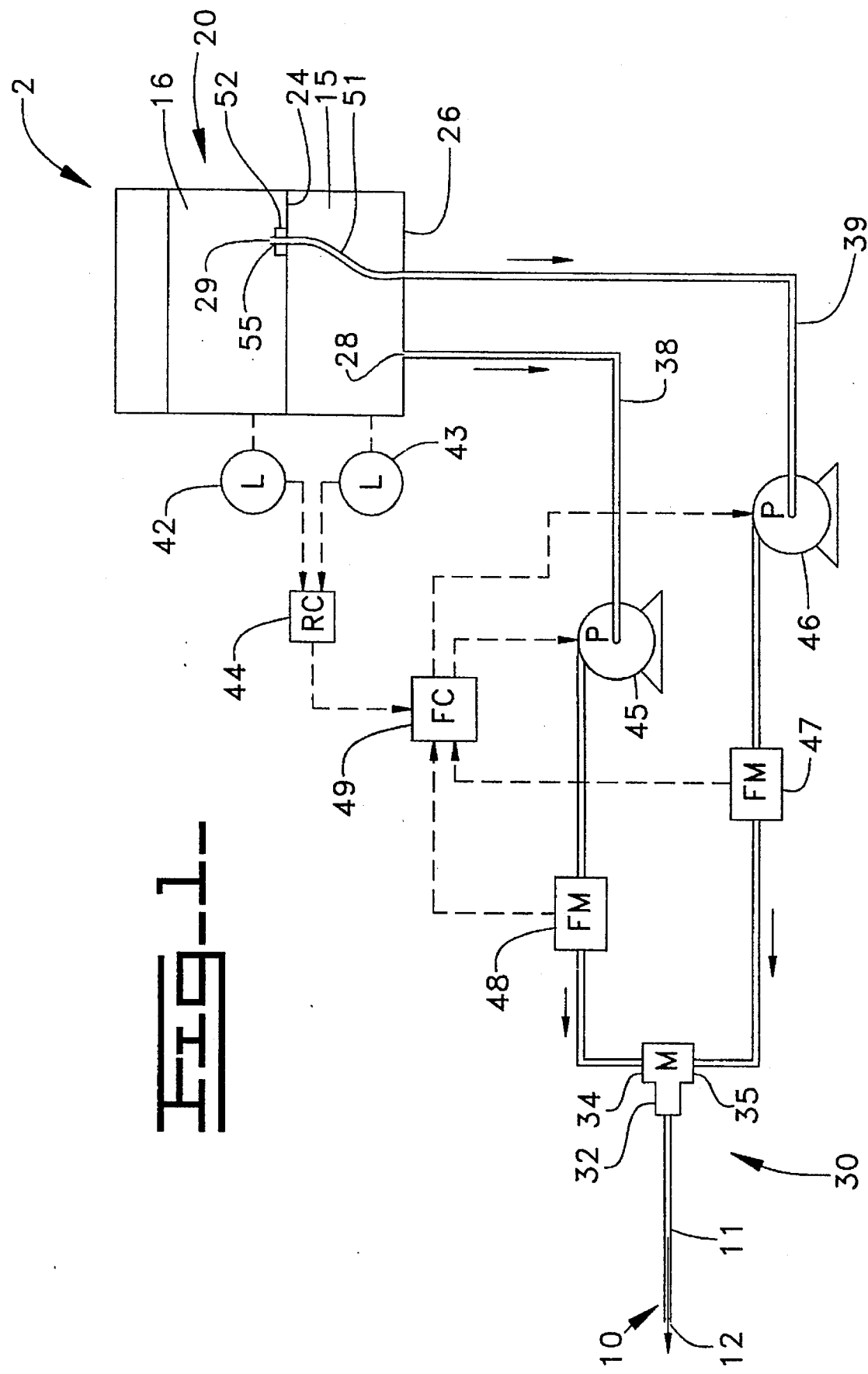
FIG. 1 is a diagrammatic view of a storage and delivery apparatus of one embodiment of the invention.

Referring to FIG. 1, apparatus 2 is provided for a fuel injection system (not shown) which is capable of using one or more different kinds of fuels for operating an engine (not shown). One example of such a fuel injection system would be one which is capable of using either a mixture of methanol and diesel fuel, or either methanol or diesel separately, and having the ability to identify the type of fuel being used and appropriately change the flow rate of fuel entering the combustion chambers and the timing of the engine.

The apparatus 2 has a fuel inlet 10. The fuel inlet has a first end 11 and a second end 12. A mixing chamber 30 has an outlet portion 32 and inlet portions 34 and 35 respectfully associated with a first non-miscible fuel and a second non-miscible fuel. The first end 11 of the fuel inlet 10 is connected in fluid communication with the outlet portion 32 of the mixing chamber 30. The second end 12 of the fuel inlet 10 is connected to a fuel injection system (not shown).

A fuel reservoir 20 is adapted for storing a first non-miscible fuel 15 and a second non-miscible fuel 16. The fuel reservoir may be made of metal or a fuel resistant plastic material, such as high density polyethylene (HDPE). The first and second non-miscible fuels define a phase interface 24 between them. The fuel reservoir 20 has a bottom 26, a first outlet 28 in fluid communication with the first non-miscible fuel 15 and a second outlet 29 in fluid communication with the second non-miscible fuel 16. The first outlet 28 is connected in fluid communication with inlet portion 34 of the mixing chamber 30 by a fuel recovery conduit 38. The second outlet 29 is connected in fluid communication with inlet portion 35 of the mixing chamber 30 by means 50 and a fuel recovery conduit 39.

Means 50, such as a flexible conduit 51 having a length at least equal to the maximum depth of the reservoir 20, a first end 52 connected to the second outlet 29, and a second end 53 connected to the fuel recovery conduit 39 in fluid communication. A float 55 is connected to the conduit first end 52 and is positioned within the reservoir 20. The float has a specific gravity less than the first fuel and greater than the second fuel. The float serves the purpose of maintaining the second outlet 29 adjacent the fluid interface 24 and in fluid communication with fuel 16.

Level sensing means 42,43, such as a pressure-type level indicator for example, are connected to the reservoir 20 in fluid communication with respective fuels 15,16 and sense the respective fuel levels and deliver electrical fluid level signals in response to said sensed levels.

Ratio controlling means 44, such as a digital convertor that serves the function of receiving electrical fuel level signals and producing flow rate command signals that are an algebraic function of the level signals for example, is electrically connected to the level sensing means 42,43.

Flow rate sensing means 47,48, such as a volumetric flow meter, a mass flow meter or a venturi type flow orifice for example, are connected to the respective fuel recovery conduits 38,39. Said means 47,48 sense the flow rate of fuels 15,16 and deliver corresponding measured flow rate signals in response to said sensed flow rates.

Pump means 45,46, such as a reciprocating, a centrifugal, or a diaphragm pump for example, are connected to the respective reservoir fuel outlets for pressuring and passing fuel into and through the mixing chamber 30.

Flow control means 49, such as a proportional-derivative-integral (PID) controller, as is well known in the art, for example, is electrically connected to the ratio controlling means 44, flow rate sensing means 47,48, and pump means 45,46. The flow control means 49 receives the flow rate command signals and the measured flow rate signals, compares the two signals, and produces an error signal and a corresponding pump command signal, to control the flow rates of the respective fuels 15,16 by varying the speeds of the respective pumps 45,46.

In a preferred embodiment of the present invention, the flow controlling means is a PID controller, the pump means is a centrifugal pump, the flow sensing means is a venturi, the ratio controlling means is a digital convertor and the level sensing means is a float type level indicator.

Referring to FIG. 2, which shows a storage and delivery apparatus according to another embodiment of the invention, a fuel reservoir 20 is adapted for storing a first non-miscible fuel 15 and a second non-miscible fuel 16. The fuel reservoir may be made of metal or a fuel resistant plastic material, such as high density polyethylene (HDPE). The first and second non-miscible fuels define a phase interface 24 between them. The second non-miscible fuel has an upper fluid surface 25. The fuel reservoir 20 has a bottom 26, a first outlet 28 in fluid communication with the first non-miscible fuel 15 and a second outlet 29 in fluid communication with the second non-miscible fuel 16. The first outlet 28 is connected in fluid communication with inlet portion 34 of the mixing chamber 30 by a fuel recovery conduit 38. The second outlet 29 is connected in fluid communication with inlet portion 35 of the mixing chamber 30 by means 50 and a fuel recovery conduit 39.

Means 50, such as first and second flexible conduits 56,51, having lengths at least equal to the maximum depth of the reservoir 20, having respective first ends 54,52 connected to the respective second outlets 28,29, and further having respective second ends 57,53 are connected to the respective fuel recovery conduits 38,39 in fluid communication. First and second floats 59,55 are respectfully connected to the conduit first ends 54,52 and are positioned within the reservoir 20. The first float 59 has a specific gravity less than the first fuel and greater than the second fuel. The second float 55 has a specific gravity less than the second fuel. The floats serve the purpose of respectfully maintaining the second outlets 28,29 adjacent fluid interface 24 and second fuel upper fluid surface 25 and in fluid communication with fuels 15,16.

Industrial Applicability

In the operation of the apparatus of this invention, the two non-miscible fuels such as methanol and diesel fuel, are stored in a single reservoir. Because of the non-miscibility of the two fuels, diesel fuel sinks to the bottom of the reservoir and methanol floats on the top of the diesel fuel.

Referring to FIG. 1, diesel fuel is recovered through fuel outlet 28 and is pressurized and passed through fuel recovery conduit 38 to the mixing chamber 30. Methanol is recovered through fuel outlet 29 and is pressurized and passed through fuel recovery conduit 39 to the mixing chamber 30. In the mixing chamber, the two fuels are mixed and delivered to a fuel inlet 10 connected to the fuel injection system of an engine.

Due to the flexible conduit 51 having a float 55 attached on one end, the fuel outlet 29 is always maintained adjacent the fuel interface 24. Referring to FIG. 2, in an alternate embodiment, both the first and second fuel outlets 28,29 are always respectfully maintained adjacent the interface 24, and fluid surface 25, by the two respective flexible conduits 56,51 having floats 59,55. These features of the instant invention make it possible to use a single reservoir to store two non-miscible fuels, thus reducing time, labor, equipment and natural resources, and enhancing the practicality of using a single reservoir fuel storage system for a multi-fuel engine.

In a preferred mode of operation, when the levels of both diesel fuel and methanol in the reservoir are greater than 20% of the respective maximum levels, the ratio controller 44 sets a volumetric ratio of 90:10 diesel fuel to methanol. Further, ratio controller 44 receives a total fuel flow rate signal from an engine controller, computes and delivers an electrical flow rate command signal to the flow rate controller 49. The flow rate controller 49 receives the measured flow rates of methanol and diesel from respective flow sensing means 47,48 and maintains a closed-loop PID control over the respective flow rates of diesel and methanol by adjusting the pump speeds. This prevents any sharp changes in the combustion properties of the fuel mixture being delivered to the engine.

When the levels of diesel fuel in the reservoir drops below 20% of its maximum level, the ratio controller 44 makes incremental changes to the volumetric ratio of diesel fuel to methanol from 90:10 to 10:90 over a period of time that the diesel fuel level drops from 20% to 10%. The ratio controller also activates a low fuel warning light for diesel fuel. This prevents any abrupt changes in the combustion properties of the fuel mixture being delivered to the engine, associated with switching over from predominantly one type of fuel to predominantly another type of fuel.

Other aspects, objects and advantages of this invention can be obtained from a study of the drawing, the disclosure and the appended claims.

I claim:

1. A fuel storage and delivery apparatus for providing one or more non-miscible fuels to a multi-fuel engine, comprising:

a fuel reservoir adapted for storing first and second non-miscible fuels in communication with each other, said first and second fuels respectively defining a phase interface therebetween, said fuel reservoir having a bottom surface and a first outlet adapted to receive said first fuel and a second outlet adapted to receive said second fuel, said first and second outlets being respectively positioned adjacent said bottom surface and said phase interface; and a mixing chamber connectable in fluid communication with said first and second outlets, and to said engine, said mixing chamber being adapted to receive said first and second fuels and supplying a mixture of said fuels in a predetermined ratio, to said engine.

2. A fuel storage and delivery apparatus, as set forth in claim 1, including, means for respectively maintaining said first and second outlets adjacent said bottom surface and said phase interface.

3. A fuel storage and delivery apparatus, as set forth in claim 2, wherein said means includes, at least one float and at least one flexible conduit, said conduit being connected at one end to said float and being positioned within said reservoir, and being connected at the other end to the mixing chamber.

4. A fuel storage and delivery apparatus, as set forth in claim 3, wherein said means include a float and a flexible conduit, said float having a specific gravity in-between the respective specific gravities of said first and second fuels defining said interface, said float being positioned at said interface, said flexible conduit being connected at one end to said float and being positioned within said reservoir, and said conduit being connected at the other end to the mixing chamber.

5. A fuel storage and delivery apparatus, as set forth in claim 3, wherein said means include a first float, said first float having a specific gravity in between the specific gravities of said first and second non-miscible fuels defining said interface, and said float being positioned in said reservoir at said interface, a second float, said second float being positioned in said reservoir adjacent said bottom surface, first and second flexible conduits, said conduits being respectively connected at one end to said floats, and at the other end to the mixing chamber.

6. A fuel storage and delivery apparatus, as set forth in claim 1, including, means for sensing the fluid levels of said first and second non-miscible fuels in said reservoir, and producing fluid level signals in response to the sensed fluid levels.

7. A fuel storage and delivery apparatus, as set forth in claim 6, including, ratio controlling means for receiving said fluid level signals and producing flow rate command signals representative of said fluid levels.

8. A fuel storage and delivery apparatus, as set forth in claim 7, including, flow rate sensing means for measuring fluid flow rate of said first and second non-miscible fuels passing through said fuel delivery apparatus, and producing a flow rate signal representative of the sensed fluid flow rate.

9. A fuel storage and delivery apparatus, as set forth in claim 8, including, means for controllably pumping said first and second non-miscible fuels passing through said fuel delivery apparatus in response to pump command signals.

10. A fuel storage and delivery apparatus, as set forth in claim 9, including, a flow controller electrically connected to said ratio controlling means, said flow rate sensing means and said pump means, said flow controller being adapted to receive said flow rate command signal and said flow rate signal, and produce said pump command signal as a function of said flow rate command signal and said flow rate signal.

11. A fuel storage and delivery apparatus for providing one or more non-miscible fuels to a multi-fuel engine, comprising:

a fuel reservoir adapted for storing first and second non-miscible fuels in communication with each other, said first and second fuels respectively defining a phase interface therebetween, said fuel reservoir having a bottom surface and a first outlet adapted to receive said first fuel and a second outlet adapted to receive said second fuel, said first and second outlets being respectively positioned adjacent said bottom surface and said phase interface; and a mixing chamber connectable in fluid communication with said first and second outlets, and to said engine, said mixing chamber being adapted to receive said first and second fuels and supplying a mixture of said fuels in a predetermined ratios, to said engine;

means for respectively maintaining said first and second outlets adjacent said bottom surface and said phase interface;

means for sensing the fluid levels of said first and second non-miscible fuels in said reservoir, and producing fluid level signals in response to the sensed fluid levels;

flow rate sensing means for measuring fluid flow rate of said first and second non-miscible fuels passing through said fuel delivery apparatus, and producing a flow rate signal representative of the sensed fluid flow rate;

a flow controller electrically connected to said level sensing means and said flow rate sensing means, said flow controller being adapted to receive said fluid level signals and said flow rate signals and maintain the flow rates of said first and second fuels passing through conduits at predetermined values, the values being a function of the fluid level signals and the flow rate signals.

12. A fuel storage and delivery apparatus for providing one or more non-miscible fuels to a multi-fuel engine, comprising;

a fuel reservoir adapted for storing a plurality of non-miscible fuels in communication with each other, said plurality of non-miscible fuels respectively defining a plurality of phase interfaces therebetween, said fuel reservoir having a bottom surface and a plurality of outlets adapted to receive said plurality of non-miscible fuels, said plurality of outlets being respectively positioned adjacent said bottom surface and said plurality of phase interfaces; and a mixing chamber connectable in fluid communication with said plurality of outlets, and to said engine, said mixing chamber being adapted to receive said plurality of fuels and supplying a mixture of said plurality of fuels in a predetermined ratio, to said engine.

13. A fuel storage and delivery apparatus, as set forth in claim 12, including, means for respectively maintaining said plurality of outlets adjacent said bottom surface and said plurality of phase interfaces.

14. A fuel storage and delivery apparatus, as set forth in claim 13, wherein said means includes, at least one float and at least one flexible conduit, said conduit being connected at one end to said float and being positioned within said reservoir at said respective interface, and being connected at the other end to the mixing chamber.

15. A fuel storage and delivery apparatus, as set forth in claim 14, wherein said means include a float and a flexible conduit, said float having a specific gravity in-between the respective specific gravities of a pair of non-miscible fuels defining an interface, said float being positioned adjacent said interface, said conduit being connected at one end to said float and being positioned within said reservoir at said interface, and said conduit being connected at the other end to the mixing chamber.

16. A fuel storage and delivery apparatus, as set forth in claim 14, wherein said means include (a) a plurality of floats, said floats having respective specific gravities in-between the specific gravities of respective pairs of non-miscible fuels defining a plurality of respective interfaces therebetween, and said floats being positioned at said respective interfaces, and (b) a plurality of flexible conduits, said conduits being respectively connected at one end to said floats, and at the other end to the mixing chamber.

17. A fuel storage and delivery apparatus, as set forth in claim 12, including, means for sensing the fluid levels of said plurality of non-miscible fuels in said reservoir, and producing fluid level signals in response to the sensed fluid levels.

18. A fuel storage and delivery apparatus, as set forth in claim 17, including, ratio controlling means for receiving said fluid level signals and producing flow rate command signals representative of said fluid levels.

19. A fuel storage and delivery apparatus, as set forth in claim 18, including, flow rate sensing means for measuring fluid flow rates of said plurality of non-miscible fuels passing through said fuel delivery apparatus, and producing a flow rate signal representative of the sensed fluid flow rate.

20. A fuel storage and delivery apparatus, as set forth in claim 19, including, means for controllably pumping said plurality of non-miscible fuels passing through said fuel delivery apparatus in response to pump command signals.

21. A fuel storage and delivery apparatus, as set forth in claim 20, including, a flow controller electrically connected to said ratio controlling means, said flow rate sensing means and said pump means, said flow controller being adapted to receive said flow rate command signal and said flow rate signal, and produce said pump command signal as a function of said flow rate command signal and said flow rate signal.

* * * * *